July 3, 1951 — R. B. HEAD — 2,559,073

THERMOSTAT FOR WATER CIRCULATING SYSTEMS

Filed Oct. 15, 1949

INVENTOR.
RALPH B. HEAD
BY Anderson & Muller
ATTORNEYS

Patented July 3, 1951

2,559,073

UNITED STATES PATENT OFFICE 2,559,073

THERMOSTAT FOR WATER CIRCULATING SYSTEMS

Ralph B. Head, Denver, Colo.

Application October 15, 1949, Serial No. 121,506

9 Claims. (Cl. 236—93)

This invention relates to improvements in thermostats for water circulating systems and more particularly those employed with internal combustion engines.

In automobiles and other devices which employ liquid cooled engines it is common practice to interpose a thermostatically controlled valve in the liquid circulating system which regulates the flow of coolant in a manner such that it remains at a predetermined temperature. In one of the most common present systems this valve is operated by a Sylphon type actuator which moves in response to changes in temperature of the coolant. The valve and Sylphon assembly of the type referred to, while well adapted to normally perform its intended office, sometimes fails to operate because the valve sticks to the valve seat thus preventing circulation of the coolant and consequent boiling thereof.

Thermostatically controlled valves of this type, while adequate to normally maintain a predetermined engine temperature in certain climatic temperatures, are frequently inadequate to permit sufficient flow of coolant through the radiator to maintain proper engine temperature in extremely hot climates, or under certain driving conditions which require a very high rate of flow of the coolant through the radiator.

If either of these foregoing conditions prevail it is apparent that boiling of the coolant may occur, with its attendant loss. When the engine is operating at excessively high temperatures, the engine may become damaged as a result thereof. Moreover, to remedy such conditions subjects the motorist to great inconvenience, and sometimes expense, especially if he is in some remote place when such conditions prevail. For example, if all of the coolant boils away, the engine temperatures may become so high that the engine will fail to function at all and the motorist cannot proceed until he obtains a new supply of coolant and corrects the fault which usually involves dismantling parts of the cooling system.

The present invention obviates the foregoing disadvantages and has for one of its objects the provision of a thermostat which may be manually operated in event the valve sticks.

Another object is the provision of control means by which greater coolant flow may be obtained when desired, than is normally possible with the present type thermostat.

Another object is to provide a device of the foregoing type which may be installed in present cooling systems with a minimum amount of modification thereto.

Another object is to construct the device with a minimum number of parts which are simple and foolproof in operation and which may be economically fabricated.

Still further objects, advantages, and salient features will become more apparent from the description to follow, the appended claims, and the accompanying drawing, in which:

Figure 5:
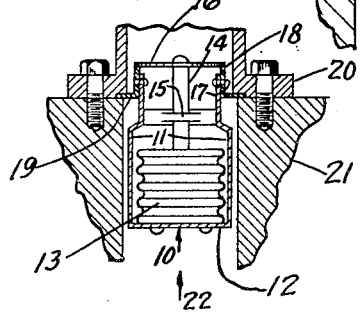
Figure 5 is a vertical section similar to Figure 1 showing a conventional type of thermostat unit over which the present invention constitutes an improvement.

Referring in detail to the drawing, there is illustrated in Figure 5 a conventional thermostat unit 10 having a U-shaped frame provided with legs 11 and bight 12, the bight having secured thereto a temperature responsive Sylphon type bellows 13 to which is secured a valve stem 14 slideable in guide 15 supported by the legs, the upper end of the valve stem having a valve head 16 secured thereto. The upper ends of legs 11 are secured to a cylindrical tube 17, the upper edge of which provides a seat 18 for valve head 16. The tube is provided with a circular flange 19, the rim of which seats between coolant conduits 20, 21 of the engine cooling system. In certain automobile engines part 21 may be the cylinder head and 20 a conduit secured thereto, the upper end of the latter being connected by a hose to the top of the radiator. In other engines parts 20, 21 may be suitable conduits interposed in a water conduit of the coolant system. As shown, the coolant flows in the direction of arrow 22 to the top of the radiator after the coolant becomes sufficiently warm to expand bellows 13 to move valve head 16 upwardly away from its seat 18, as is well understood in the art. This is the valve previously referred to which sometimes sticks to its seat, thus preventing circulation of the coolant, or unduly restricts the flow of coolant in very hot climates, or under certain other driving conditions. Since the entire thermostat unit is enclosed within conduits there is no possible way to release the valve except by dismantling the conduits, which of course, entails draining of the cooling system.

It will now become apparent that if some means were provided to open this valve, when it sticks, from a point exterior of the conduits, proper circulation of the coolant could be resumed without draining the cooling system or dismantling any of the parts thereof. Also, if the normal maximum flow permitted by the valve, could be increased, then boiling of the coolant, or operation of the engine at undesired excessive temperatures, could be obviated. The manner in which these results are attained will now be described.

Referring to Figures 1 to 4, the unit 10a is similar, in general, to the one shown in Figure 5, having a frame with legs 11a, bellows 13 secured thereto, valve stem 14 slideable in guide 15, the upper end of the valve stem having a valve head 16 secured thereto by a screw 25. It will be noted that the flanged tube 17 of Figure 5 is omitted and in its stead a plate or conduit means 17a is employed, the upper surface of which provides a seat 18a for valve head 16. The upper ends of legs 11a are slideably mounted in plate 17a and are provided with gear teeth 26, 26¹. A rod 27 is suitably journalled in plate 17a and has secured thereto a pair of pinions 28, 29 which mesh with the teeth 26, 26¹, respectively, on legs 11a, the outer end of the rod being bent to provide a lever 30 for rotating it. Suitable temperature calibrations 31 are provided on the plate and leakage along the rod is prevented by packing 32, compressed by pack nut 33, the packing also serving to provide friction means for retaining rod 27 in a position of adjustment. It will now become apparent that when lever 30 is rotated, the entire unit 10a is bodily moved relative to plate 17a. To aid in guiding the unit an additional pair of legs 11b are provided, the upper ends thereof being slideable in the plate in the same manner as legs 11a. The pinions 28, 29 have teeth only partially around their periphery so that the portions at 34 form limit stops to prevent unauthorized excessive movement of the unit either upwardly or downwardly.

Figure 1:
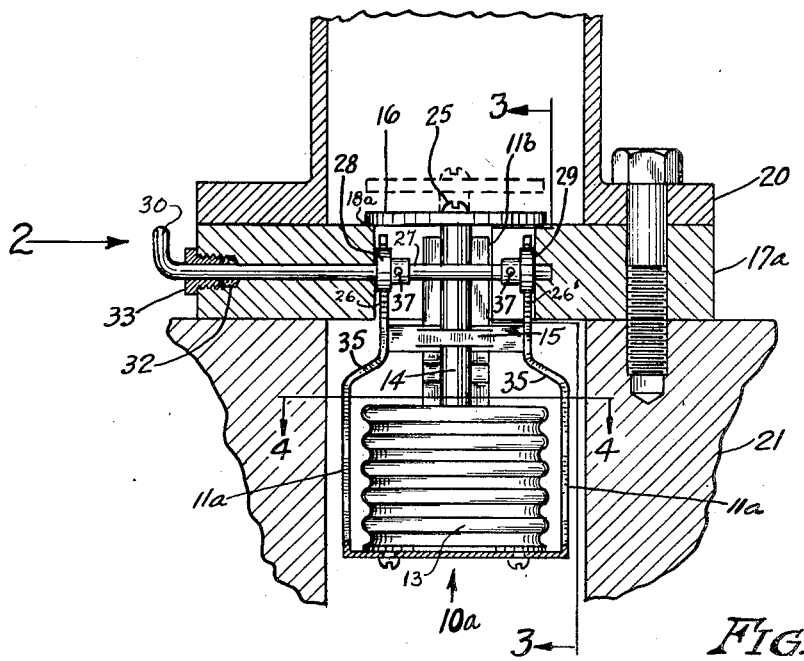
Figure 1 illustrates a vertical section through portions of a cooling system in which the subject of the present invention is installed.
Figure 2:
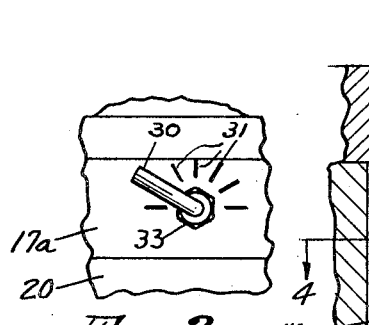
Figure 2 is a side elevation as viewed in the direction of arrow 2, Figure 1.
Figures 3, 4:
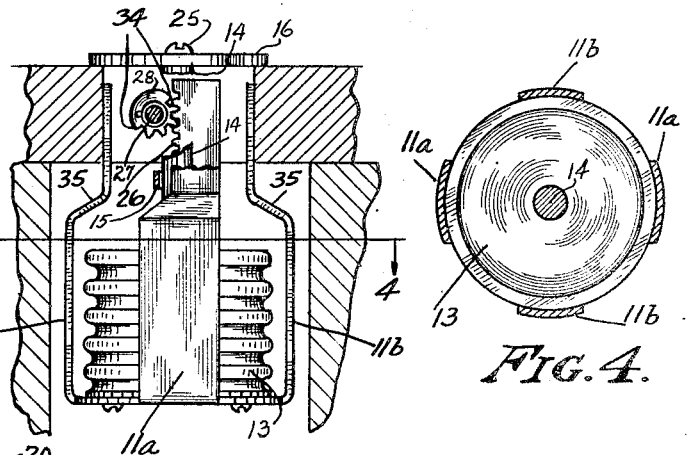
Figure 3 is a section taken on line 3—3, Figure 1.
Figure 4 is a section taken on line 4—4, Figures 1 and 3.

Assuming now that the parts are as shown in full lines in Figure 1 with the valve closed, in normal operation the valve would open to the dotted line position when the bellows expands in response to temperature rise of the coolant. If the valve should stick on seat 18a of plate 17a and fail to open in the normal manner, it may be manually opened by rotating lever 30. After breaking the valve loose from its seat the lever may be returned to its original setting, if desired, and the valve will again function normally provided the bellows has not been punctured by corrosion or other cause. If the latter condition prevails the lever would be left at the position wherein the valve is open until a new thermostat unit is installed.

It will be noted that the distance which the bellows 13 may expand (in either Figure 1 or 5) is limited by the inwardly directed portions 35 of legs 11 or 11a. This distance, to the point of maximum expansion, of course, represents the maximum amount of movement of valve head 16. It is apparent therefore, in the construction shown in Figure 5, that when the bellows expands to its limit, valve 16 is wide open with maximum coolant flow. In event the outside air temperature is so high that this flow does not maintain the engine below boiling temperature, then the water will boil away, as previously described.

With the present construction, however, as shown in Figure 1, the entire unit may be bodily raised. The effect of this is to permit the valve to still have its same amount of movement, but in addition, the annular orifice between the valve and valve seat is increased in length by the amount the unit is raised in conduit 17. It is apparent, therefore, that with a certain predetermined valve movement of the construction shown in Figure 5, the effective movement or lift is increased by the amount of bodily movement of the unit in conduit 17a. This of course, permits a greater coolant flow than would normally be possible, and therefore effects cooling of the engine at extreme climatic temperatures.

It will also be apparent that changing the position of the unit 10a relative to plate 17a, changes its calibration, and hence the motorist who desires seasonal changes in coolant temperature may obtain same by adjustment of the unit relative to plate 17a.

In assembling the device shown, rod or shaft 27 is installed in its normal position in plate 17a, with pinions 28, 29 loosely journaled thereon. The upper ends of legs 11a and 11b are then inserted in plate 17a and the pinions 28, 29 moved into proper mesh with teeth 26, 26¹, respectively, after which the pinions are secured to the rod or shaft 27 by screws or pins 37, or their equivalents. Valve head 16 is then placed on the valve stem and secured by screw 25 and the entire assembly of the plate and thermostat unit is ready for installation between conduits 20, 21, the plate being apertured or otherwise constructed so that it may be installed as a replacement unit in systems such as shown in Figure 5.

Having described the invention what I claim as new is:

1. A coolant flow control device comprising, a U-shaped frame having a heat responsive expansible bellows disposed between the legs of the frame and secured to the bight thereof, a plate having an aperture therein receiving and guiding the free ends of the legs for movement in a direction axially of the aperture and axially of the direction of expansion of the bellows, the side of the plate opposite from the bellows forming a valve seat, a valve stem attached to the free end of the bellows for movement axially of the aperture, a valve attached to the end of the valve stem on the side of the plate opposite from the bellows, a shaft journaled in the plate, having one end accessible from the outside, a portion of the shaft intersecting the aperture, and cooperating means on the shaft and on the frame for moving the latter axially when the shaft is turned.

2. A device in accordance with claim 1 including a pair of pinions secured to the rod and meshing with teeth on the free ends of said legs whereby rotation of the rod moves said frame axially of said aperture.

3. A device in accordance with claim 2 wherein said frame includes at least one additional leg, the lower end of which is secured to the bellows, and the upper free end received and guided in said aperture, said leg being angularly disposed between the other legs of the U-shaped member.

4. A device in accordance with claim 2 including stop means for limiting movement of the frame in said aperture in both directions of axial movement relative thereto.

5. A coolant flow control device comprising, a plate-like conduit means having an opening, said means being adapted to be positioned between two adjacent sections of a coolant conveying conduit, the opening being in alignment with the passage in the conduit, a shaft journaled in bearings in said conduit means, one end being accessible on the outside and the other end terminating in the opening, a U-shaped frame having its free ends positioned in the opening and guided thereby, a heat responsive expansible bellows disposed between the legs of said frame, means securing one end of the bellows to the bight of said frame, a valve stem attached to the other end of the bellows, the free end of said stem projecting entirely through the opening in the conduit means, a valve attached to the free end of the valve stem for movement from and to opening sealing position when the bellows changes its length in response to temperature changes, and means comprising the shaft for moving the U-shaped frame with its attached bellows, valve stem and valve transversely of the conduit means whereby the valve can be moved to inoperative position.

6. A control device in accordance with claim 5 in which the free ends of the U-shaped member have teeth and in which the shaft has pinions engaging said teeth forming a device for moving the parts in the direction of the axis of the opening.

7. A device in accordance with claim 5 in which the U-shaped member has means positioned between the top of the bellows and the valve for guiding the valve stem and valve.

8. A coolant flow control device comprising a plate adapted to be positioned between two adjacent sections of a coolant conduit, said plate having an opening of smaller diameter than the openings in the conduit, the plate having a bearing whose axis intersects the opening in the plate to one side of a diameter, a shaft journaled in the bearing, the outer end of the shaft being accessible for manual rotation, a substantially U-shaped frame having its free ends terminating in the opening in the plate, cooperating means on the shaft and on the free ends of said frame for converting rotary motion of the shaft into linear motion of the frame, a heat responsive expansible bellows having one end attached to the bight of the frame, a valve stem attached to the other end of the bellows, said stem projecting through the opening in the plate, a valve attached to the end of the stem, said valve being movable toward and away from the plate as the bellows contracts and expands, the parts being so proportioned that by means of the shaft the frame with its attached bellows, valve stem and valve may be moved to a position in which the valve will not seat.

9. A device in accordance with claim 8 in which the frame has means projecting into the path of the free end of the bellows to limit its expansion.

RALPH B. HEAD.

REFERENCES CITED

The following references are of record in the file of this patent:

UNITED STATES PATENTS

| Number | Name | Date |
|---|---|---|
| 1,714,758 | Bioch | May 28, 1929 |
| 1,873,769 | Lang | Aug. 23, 1932 |
| 2,096,094 | Dube et al. | Oct. 19, 1937 |
| 2,271,644 | Jaynes | Feb. 3, 1942 |

FOREIGN PATENTS

| Number | Country | Date |
|---|---|---|
| 421,900 | Great Britain | Jan. 2, 1935 |
| 421,938 | Great Britain | Jan. 2, 1935 |